United States Patent
Hoffmann et al.

(10) Patent No.: US 7,150,270 B2
(45) Date of Patent: Dec. 19, 2006

(54) ARRANGEMENT FOR HANDLING THE FUEL SUPPLY IN A COMMON RAIL FUEL INJECTION SYSTEM

(75) Inventors: Michael Hoffmann, Weinstadt (DE); Magnus Korte, Leonberg (DE); Ulrich Rieger, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 190 days.

(21) Appl. No.: 11/035,759

(22) Filed: Jan. 14, 2005

(65) Prior Publication Data

US 2005/0150480 A1     Jul. 14, 2005

Related U.S. Application Data

(63) Continuation-in-part of application No. PCT/EP03/05764, filed on Jun. 3, 2003.

(30) Foreign Application Priority Data

Jul. 18, 2002    (DE) ................. 102 32 514

(51) Int. Cl.
  F02M 37/04    (2006.01)
  F02M 15/00    (2006.01)
(52) U.S. Cl. .............. 123/514; 123/541; 123/510
(58) Field of Classification Search .......... 123/510, 123/514, 541
  See application file for complete search history.

(56) References Cited

U.S. PATENT DOCUMENTS

| 4,411,239 | A | * | 10/1983 | Kelch ........................ 123/557 |
| 4,454,851 | A | * | 6/1984 | Bourbonnaud et al. ..... 123/557 |
| 4,481,931 | A | * | 11/1984 | Bruner ...................... 123/557 |
| 4,809,665 | A | * | 3/1989 | Mosig et al. ............... 123/514 |
| 4,872,438 | A | * | 10/1989 | Ausiello et al. ............ 123/514 |
| 5,085,198 | A | * | 2/1992 | Bartlett et al. ............. 123/510 |
| 5,263,456 | A | * | 11/1993 | Owen-Evans ............... 123/495 |
| 5,711,282 | A | * | 1/1998 | Lang et al. ................. 123/549 |
| 5,794,598 | A |   | 8/1998 | Janik et al. |
| 5,887,572 | A | * | 3/1999 | Channing ................... 123/514 |
| 6,398,119 | B1 | * | 6/2002 | Duffer et al. .............. 236/93 A |
| 6,457,460 | B1 | * | 10/2002 | Doane et al. ............... 123/541 |
| 6,626,162 | B1 | * | 9/2003 | Shelor et al. .............. 123/541 |
| 6,923,165 | B1 | * | 8/2005 | Draves et al. .............. 123/510 |

FOREIGN PATENT DOCUMENTS

| DE | 199 63 229 | 6/2001 |
| DE | 100 01 434 | 8/2001 |
| EP | 0 656 470 | 6/1995 |
| GB | 2 292 184 | 2/1996 |

* cited by examiner

*Primary Examiner*—Thomas Moulis
(74) *Attorney, Agent, or Firm*—Klaus J. Bach

(57) ABSTRACT

In an arrangement for handling the fuel in a common rail fuel injection system of an internal combustion engine, wherein fuel is supplied from a tank via a fuel delivery line including a first fuel filter, a low-pressure pump arranged upstream from the first fuel filter and a high pressure pump arranged downstream of the first fuel filter to a high pressure fuel rail from which the fuel is distributed to the cylinder of the engine, a bypass line extends from the high pressure fuel rail to the fuel delivery line and includes a second fuel filter and a heat exchanger which is operatively connected to a cooling circuit of an air conditioning system or to a cooling circuit of the internal combustion engine.

11 Claims, 2 Drawing Sheets

ARRANGEMENT FOR HANDLING THE FUEL SUPPLY IN A COMMON RAIL FUEL INJECTION SYSTEM

This is a Continuation-In-Part Application of International Application PCT/EP03/05764 filed Jun. 03, 2003 and claiming the priority of German application 102 32 514.6 filed Jul. 18, 2002.

BACKGROUND OF THE INVENTION

The invention resides in an arrangement for handling the fuel in a common-rail fuel injection system of an internal combustion engine, having a fuel supply line with a low pressure pump and a first fuel filter arranged in the fuel supply line downstream of the low-pressure pump and a high-pressure pump, arranged in the fuel line downstream of the first fuel filter for supplying high pressure fuel to a fuel injection rail of the internal combustion engine, as well as a bypass line, which includes a heat exchanger and a second filter for returning fuel into the fuel supply line upstream of the high-pressure pump.

A fuel circuit having a tank and a low-pressure pump connected via a fuel line is already known from U.S. Pat. No. 5,794,598. A fuel filter and then a high-pressure pump, which is connected to the internal combustion engine, are provided downstream of the low-pressure pump. A return line extends from the high-pressure pump and is connected back to the fuel line upstream or downstream of the fuel filter, the return line having a heat exchanger. The heat exchanger is designed as a fuel/air or fuel/coolant and coolant/air heat exchanger. An additional filter may also be arranged within the return line.

GB 2 292 184 describes on page 9, final paragraph, a return line (recirculation duct 334) for the injection rail. The document does not describe a bypass line for the injection rail causing the fuel to bypass the injection rail. The document also does not describe the use of a cooling circuit of an air-conditioning system or of an internal combustion engine.

EP 0 656 470 A also describes a return line but not a bypass line.

DE 199 63 229 A, contrary to the cooling device according to the invention, describes a device for heating fuel which is equipped with a return line.

It is the object of the present invention to provide a fuel supply circuit for a common rail injection system of an internal combustion engine in such a manner as to ensure simple and inexpensive cooling for the fuel.

SUMMARY OF THE INVENTION

In an arrangement for handling the fuel in a common rail fuel injection system of an internal combustion engine, wherein fuel is supplied from a tank via a fuel delivery line including a first fuel filter, a low-pressure pump arranged upstream of the first fuel filter and a high pressure pump arranged downstream of the first fuel filter to a high pressure fuel rail from which the fuel is distributed to the cylinders of the engine, a bypass line extends from the high pressure fuel rail to the fuel delivery line and includes a second fuel filter and a heat exchanger which is operatively connected to a cooling circuit of an air conditioning system or to a cooling circuit of the internal combustion engine.

As a result, the cooling power which is present for the internal combustion engine can in part be utilized to cool the fuel circuit. During low-power operating conditions of the internal combustion engine, the proportion of the volumetric flow of fuel delivered through the high-pressure pump which is diverted via the bypass line is relatively high. The cooling power of the engine cooling and/or the charge-air cooling which is present or required is in this case lower. By contrast, under high-power operating conditions of the internal combustion engine, a relatively low proportion of the volumetric flow of fuel delivered by the high-pressure pump is taken off via the bypass line, since the throughput of fuel through the internal combustion engine rises greatly in relation to the high-pressure pump pumping volume. The cooling power available can therefore be used for engine cooling and/or charge-air cooling, since the cooling power for the proportion of fuel which is diverted via the bypass line is correspondingly low. According to the invention, it is possible to compensate for, and optimally exploit, these contradictory developments or requirements in terms of the cooling power.

For the present invention, it is particularly important that a first nonreturn valve is provided within the bypass line, downstream of the injection rail and upstream of the heat exchanger, as seen in the direction of flow. The excess fuel which is produced therefore flows out into the bypass line via the first nonreturn valve and can no longer flow back into the injection rail on account of reversed pressure conditions.

For this purpose, it is advantageous for the heat exchanger to have a common housing with the second fuel filter or for the heat exchanger to be arranged at the second fuel filter. This arrangement facilitates installation and handling.

In this context, it is also advantageous if the heat exchanger is mounted on the vehicle body adjacent the engine or directly at the internal combustion engine, upstream of the charge-air or water cooler and/or upstream of the air-conditioning condenser. The arrangement of the heat exchanger can be matched to the space conditions, in particular in the event of retrofitting.

Finally, according to a preferred embodiment of the invention, the heat exchanger may be connected to a charge-air duct of the internal combustion engine. The cooling power required for the charge air can be used to cool the fuel when there is a low volumetric flow of charge air. This also results in very short fuel lines, since the charge-air cooler is arranged in the immediate vicinity of the fuel injection rail.

Also, the second fuel filter may be arranged downstream of the injection rail and upstream of the heat exchanger, as seen in the direction of flow. This prevents soiling of the fuel filter and of the high-pressure pump as a result of residues in the internal combustion engine. In particular in connection with fuel filters which have a very small flow cross-section for increasing the heat transfer, soiling must be avoided at all costs.

Furthermore, it is advantageous if the heat exchanger is air-cooled and operatively connected to a charge-air cooling system. This makes it possible to achieve the required cooling power.

In the design and arrangement according to the invention, it is advantageous if a second nonreturn valve is provided within the bypass line, downstream of the heat exchanger or downstream of the second filter with respect to the direction of flow. This second nonreturn valve prevents fuel from entering the bypass line from the low-pressure pump.

Furthermore, it is advantageous for the bypass line to be connected downstream of the low-pressure pump and/or upstream of the first fuel filter with respect to the direction of flow and for the first fuel filter and the second fuel filter to have a common housing. This avoids the need to provide a separate filter housing and reduces maintenance costs.

It is also advantageous for the fuel injection rail of the internal combustion engine to have a return line which is connected to the bypass line.

Further advantages and details of the invention will become more readily apparent from the following description thereof on the basis of the accompanying drawings:

DESCRIPTION OF A PREFERRED EMBODIMENT

Figure 1:
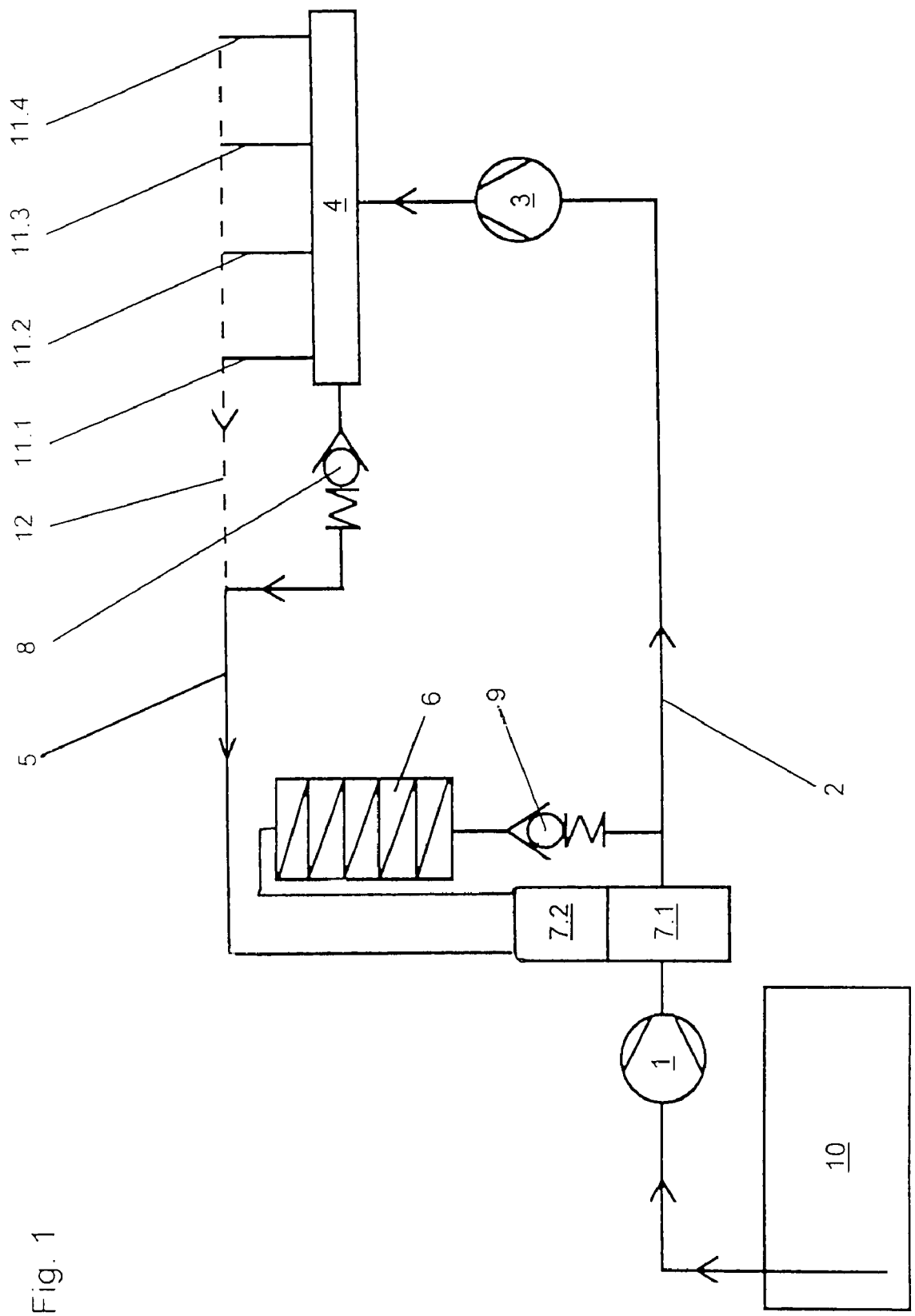
FIG. 1 diagrammatically depicts a fuel circuit with low-pressure pump and high-pressure pump, as well as a bypass line with a heat exchanger.

The fuel circuit shown in FIG. 1 includes a fuel tank 10, from which a fuel line 2 extends to an injection rail 4 of an internal combustion engine (not shown). A low-pressure pump 1 is provided downstream of the fuel tank 10, and a first fuel filter 7.1 is disposed in the fuel line 2. Downstream of the first fuel filter 7.1, the fuel line 2 includes a high-pressure fuel pump 3, which supplies the injection rail 4 with highly pressurized fuel.

In addition to the connection for injectors 11.1 to 11.4, a bypass line 5 is connected to the injection rail 4 for returning excess fuel back to the fuel line 2. The bypass line 5 is in this case connected to the fuel line 2 between the low-pressure pump 1 and the high-pressure pump 3.

A second fuel filter 7.2 and downstream thereof a heat exchanger 6 are provided in the bypass line 5. The heat exchanger 6 is in this case operatively connected to a cooling circuit (not shown) or to the charge-air cooler and/or the air-conditioning system of the internal combustion engine.

The high-pressure pump 3 delivers more fuel than is needed for injection into the internal combustion engine via the injectors 11.1 to 11.4, and consequently the excess fuel flows back via the bypass line 5. A return line 12 is connected to the bypass line 5, and via this return line excess fuel from the injectors flows into the bypass line 5, the connection location for the return line being provided upstream of the second fuel filter 7.2, as seen in the direction of flow.

The bypass line 5 includes a first non-return valve 8, following the injection rail 4, preventing the fuel from flowing back from the bypass line 5 into the injection rail 4. Moreover, a second nonreturn valve 9, which prevents fuel from lowing back from the low-pressure pump 1 into the bypass line 5, is provided at the end of the bypass line 5 upstream of the connection to the fuel line 2.

Figure 2:
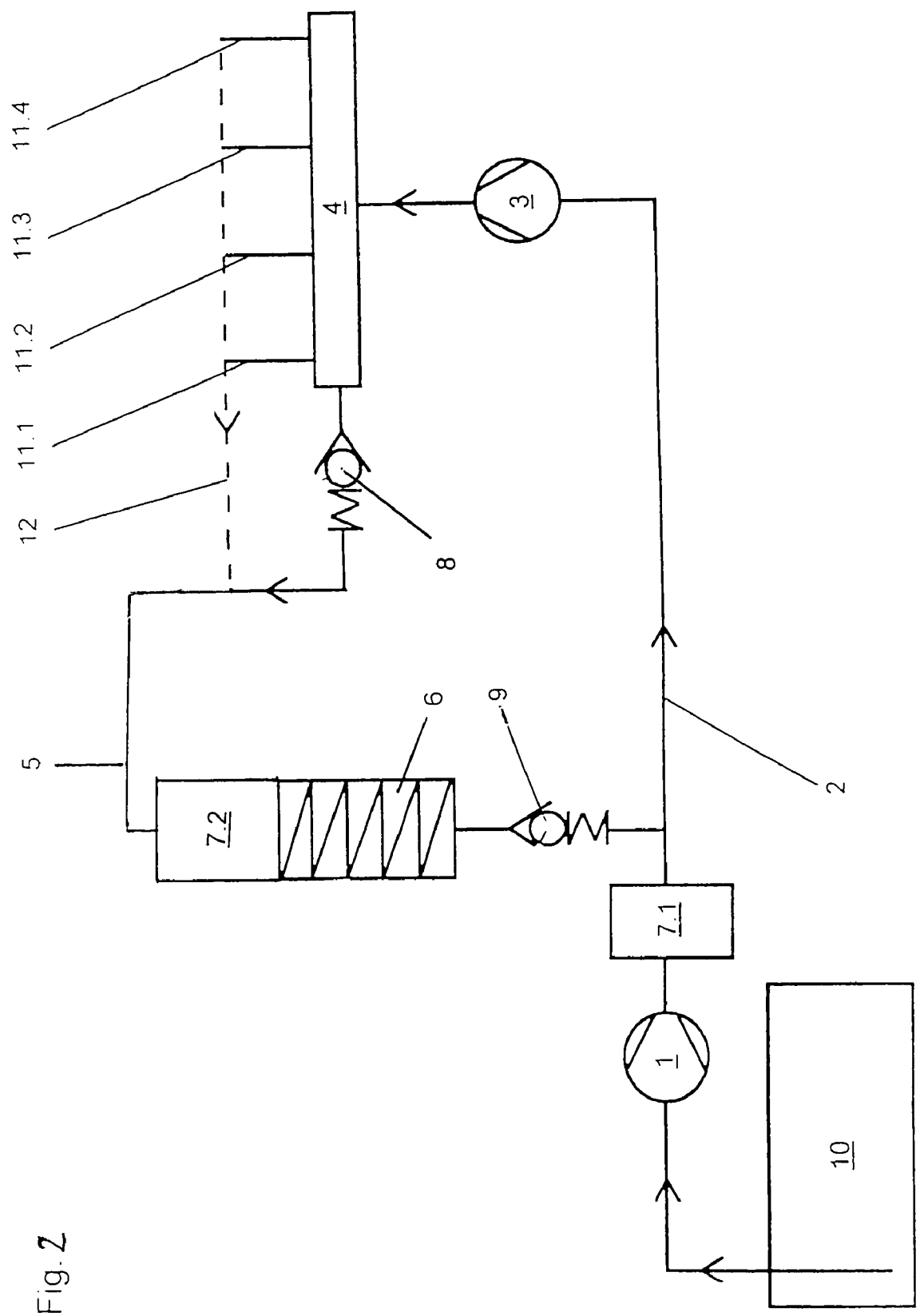
FIG. 2 shows another embodiment of the fuel circuit according to the invention.

In an exemplary embodiment as shown in FIG. 1, the bypass line 5 is connected to the return line 5 upstream of the first fuel filter 7.1, as seen in the direction of flow. As shown in FIG. 1, the first fuel filter 7.1 may be combined to form a single unit with the second fuel filter 7.2. The second fuel filter 7.2 however may alternatively be combined with the heat exchanger 6 as shown in FIG. 2.

What is claimed is:

1. An arrangement for handling the fuel in a common rail fuel injection system of an internal combustion engine, including a fuel tank (10), a fuel delivery line (2) extending from the tank (10) to a high pressure fuel rail (4) for supplying high pressure fuel to the cylinders of the internal combustion engine, a first fuel filter (7.1) disposed in the fuel delivery line (2), a low-pressure pump (1) arranged in the fuel delivery line (2) upstream of the first fuel filter (2) and a high-pressure pump (3) arranged in the fuel delivery line (2) downstream of the first fuel filter (7.1), a bypass line (5), which extends from the high pressure fuel rail (4) to the fuel delivery line 2 and includes a heat exchanger (6) and a second fuel filter (7.2), for returning fuel into the fuel line (2), the bypass line (5) including a heat exchanger (6) operatively connected to one of a cooling circuit of an air conditioning system or to a cooling circuit of the internal combustion engine.

2. The arrangement as claimed in claim 1, wherein a first nonreturn valve (8) is provided within the bypass line (5), downstream of the injection rail (4) and upstream of the heat exchanger (6).

3. The arrangement as claimed in claim 1, wherein the heat exchanger (6) and the second fuel filter (7.2) are arranged in a common housing.

4. The arrangement as claimed in claim 1, wherein the heat exchanger (6) is mounted to the vehicle body or directly to the internal combustion engine, upstream of a charge-air or water cooler and/or upstream of an air-conditioning condenser.

5. The arrangement as claimed in claim 1, wherein the heat exchanger (6) is mounted to a charge-air duct of the internal combustion engine and is operatively connected to said duct.

6. The arrangement as claimed in claim 1, wherein the second fuel filter (7.2) is arranged downstream of the injection rail (4) and upstream of the heat exchanger (6), as seen in the direction of flow.

7. The arrangement as claimed in claim 1, wherein the heat exchanger (6) is air-cooled and is operatively connected to a charge-air cooling system.

8. The arrangement as claimed in claim 1, wherein a second nonreturn valve (9) is provided within the bypass line (5), downstream of the heat exchanger (6) or downstream of the second filter (7.2).

9. The arrangement as claimed in claim 1, wherein the bypass line (5) is connected to the fuel line (2) downstream of the low-pressure pump (1) and upstream of the first fuel filter (7.1).

10. The arrangement as claimed in claim 9, wherein the first fuel filter (7.1) and the second fuel filter (7.2) have a common housing.

11. The arrangement as claimed in claim 1, wherein the injection rail (4) of the internal combustion engine has a return line (12) which is connected to the bypass line (5) for returning excess fuel from the injectors (11.1–11.4) to the bypass line (5).

* * * * *